No. 740,237. Patented September 29, 1903.

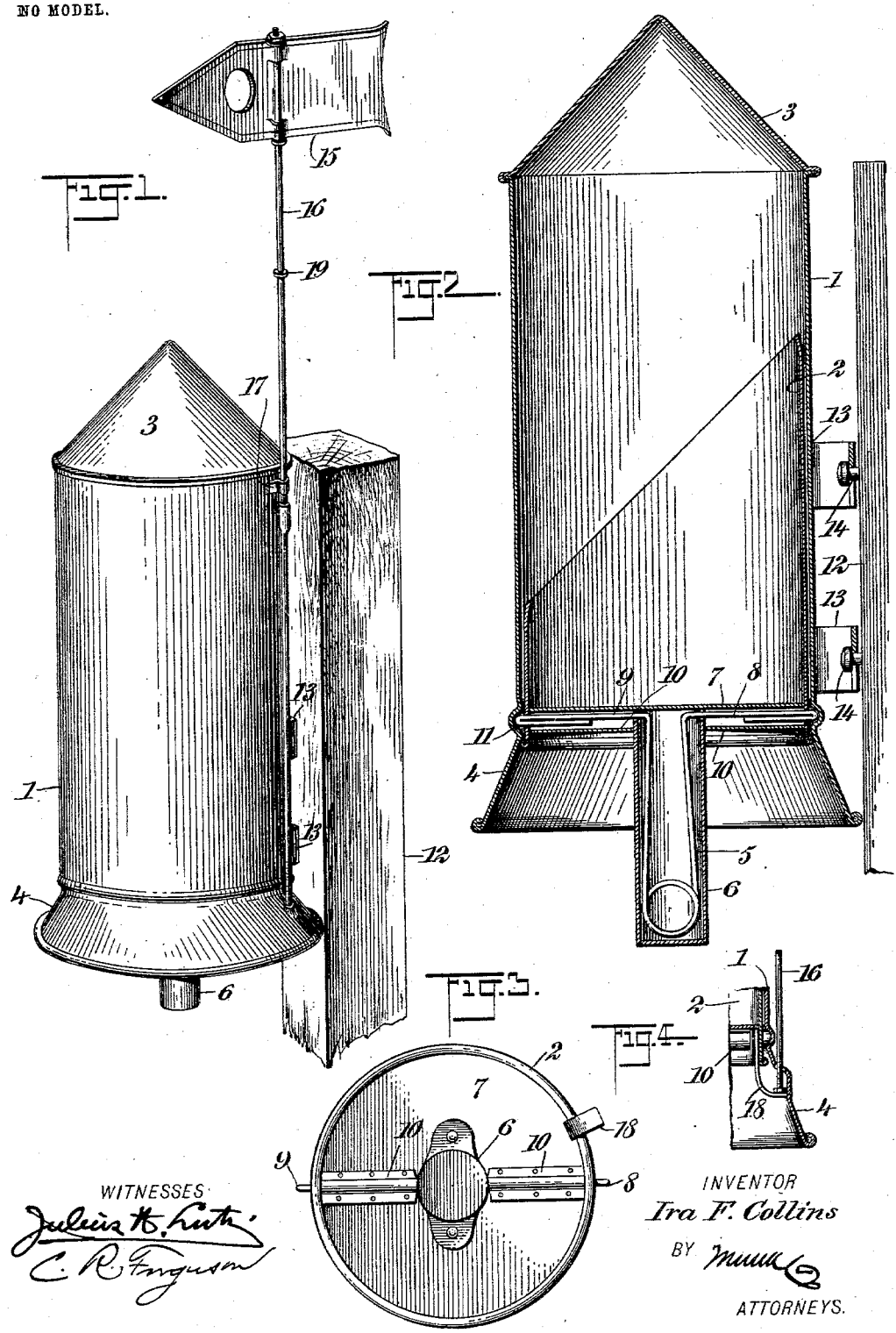

UNITED STATES PATENT OFFICE.

IRA F. COLLINS, OF SABETHA, KANSAS.

MAIL-BOX.

SPECIFICATION forming part of Letters Patent No. 740,237, dated September 29, 1903.

Application filed April 29, 1903. Serial No. 154,819. (No model.)

*To all whom it may concern:*

Be it known that I, IRA F. COLLINS, a citizen of the United States, and a resident of Sabetha, in the county of Nemaha and State of Kansas, have invented a new and Improved Mail-Box, of which the following is a full, clear, and exact description.

This invention relates to improvements in mail-boxes particularly adapted for use on rural mail-routes; and an object of the invention is to provide a mail-box of simple construction and inexpensive and so arranged as to protect the deposited mail-matter from rain or snow and which can be quickly opened and closed, resulting in a great saving of time in the collection and delivery of mail.

I will describe a mail-box embodying my invention and then point out the novel features in the appended claims.

Reference is to be had to the accompanying drawings, forming a part of this specification, in which similar characters of reference indicate corresponding parts in all the figures.

Figure 1 is a perspective view of a mail-box embodying my invention. Fig. 2 is a sectional elevation thereof. Fig. 3 is a bottom view of the receiver, and Fig. 4 is a sectional detail showing a means for supporting an indicating device in elevated position.

The mail-box comprises an outer casing 1 of suitable metal and a mail-receiving receptacle 2, arranged to slide into and out of the casing 1. This receiver 2 also consists of metal. The top 3 of the casing 1 is made conical, so that snow or water will readily pass off the same. The lower end of the casing is open, and its lower portion 4 is flared outward, so as to facilitate the inserting of the mail-receptacle. The receptacle 2 is removably secured in place by automatic locking and releasing devices, which, as here shown, consist of a spring 5, the body portion of which extends downward into a tube 6, secured to the bottom 7 of the receptacle 2. This tube 6 not only provides a chamber to receive the body portion of the spring, but it also forms a handle for removing or inserting the part 2. The upper ends of the spring members are turned outward in opposite directions, as indicated at 8 9, said outwardly-extended portions being passed through openings in the upper end of the tube 6, thence through trough-like casings 10, and secured to the bottom 7 of the receptacle 2.

The extreme ends of the portions 8 9 pass through openings in a flange extended downward from the bottom 7 and are adapted to engage in an annular channel 11, formed in the lower portion of the casing 1. This channel, it will be noted, has its wall curved in cross-section, and the extreme ends of the parts 8 9 are rounded, so as to provide but little friction in removing or inserting the receptacle. It will be noted that the upper end of the receptacle 2 is inclined, making the device of varying depths—that is, the front wall will be very much lower than its opposite wall, thus facilitating the passing in of a person's hand to remove mail-matter.

The box is designed to be attached to a suitable support. I have here shown it as removably attached to a post 12 by means of clips 13, attached to the casing 1 and having outwardly-opening slots for receiving headed lugs or pins 14 on the post.

To notify the postman that the box contains mail-matter to be collected, I provide an indicator, here shown in the form of a flag or vane 15, mounted to rotate on a rod 16. This rod is mounted to slide through a loop 17 on the casing 1, and the lower end passes through an opening in the flange 4 to engage with a curved plate 18, attached to the bottom of the receptacle 2.

When the box contains mail-matter to be collected, the indicator is to be elevated, as indicated in Fig. 1, and the receptacle inserted so that the plate 18 will engage the lower end of the rod 16. When there is no mail-matter to be collected or delivered, the indicator is to be lowered until a collar 19 on the rod engages with the loop 17. Of course to permit this lowering the receptacle 2 must be rotated to move the plate 18 out of engagement with the lower end of the rod. I have here shown the rod as consisting of two sections; but this is not essential to the invention.

In the operation to withdraw the receptacle 2 it is only necessary to give a quick pull to the handle or tube 6, which will cause the spring members 8 9 to move inward by the outer ends engaging with the wall of the channel 11, and upon inserting the receptacle the ends of said spring members will engage with the flange 4, moving the said members inward, so that they may spring outward into the channel 11 when in position.

Having thus described my invention, I claim as new and desire to secure by Letters Patent—

1. A mail-box, comprising a casing closed at the top and open at the bottom, a mail-receptacle movable into and out of the casing, a tube depending from the said receptacle, and a spring having its body portion arranged in said tube, the upper ends of the spring members being turned outward for locking engagement with the casing.

2. A mail-box comprising an outer casing closed at its top and open at the bottom, an annular channel being formed at the lower end, a mail-receptacle movable into and out of said lower end, a tube depending from the bottom of said receptacle, and a spring having its body portion arranged in said tube, the upper ends of the spring members being turned outward and adapted to engage in said channel.

3. A mail-box comprising a casing having an annular channel in its lower end, a portion of said casing below the channel being flared outward, a mail-receptacle movable into and wholly out of said casing, a handle depending from the bottom of said receptacle, and automatically-operating spring locking devices carried by the receptacle and adapted for engaging in said channel.

4. A mail-box comprising an outer casing, a mail-receptacle movable into and out of said casing, means for locking the receptacle in position, an indicator, a rod on which the indicator is mounted, the said rod being mounted to slide vertically with relation to the casing, and a plate attached to the receptacle for holding the rod in elevated position.

In testimony whereof I have signed my name to this specification in the presence of two subscribing witnesses.

IRA F. COLLINS.

Witnesses:
PHIL M. SHERWOOD,
GEO. A. GUILD.